United States Patent [19]

Burkhardt

[11] 4,147,252

[45] Apr. 3, 1979

[54] CONVEYOR WITH PUSHER FINGERS

[75] Inventor: Gisbert Burkhardt, Reichenau, Fed. Rep. of Germany

[73] Assignee: Licentia Patent-Verwaltungs-G.m.b.H., Frankfurt, Fed. Rep. of Germany

[21] Appl. No.: 800,919

[22] Filed: May 26, 1977

[30] Foreign Application Priority Data

May 29, 1976 [DE] Fed. Rep. of Germany ....... 2624216

[51] Int. Cl.$^2$ .......................................... B65G 19/22

[52] U.S. Cl. .................................. 198/732; 198/735; 209/900; 271/271; 198/841

[58] Field of Search ............... 198/644, 649, 719, 725, 198/727, 728, 729, 732, 733, 734, 735, 837, 841; 214/1 M; 209/DIG. 1; 271/198, 271

[56] References Cited

U.S. PATENT DOCUMENTS

| | | | |
|---|---|---|---|
| 404,263 | 5/1889 | Dodge | 198/837 |
| 880,509 | 3/1908 | Davis | 198/732 |
| 2,546,512 | 3/1951 | Lewis | 198/735 |
| 2,861,677 | 11/1958 | Van Marle | 198/732 |
| 3,198,316 | 8/1965 | Bivans | 198/728 |
| 3,220,547 | 11/1965 | Krupotich | 209/DIG. 1 |
| 3,233,557 | 2/1966 | Rickel | 198/733 |
| 3,523,605 | 8/1970 | McClelland, Jr. et al. | 198/734 |
| 3,593,864 | 7/1971 | Moser | 198/837 |
| 3,669,238 | 6/1972 | Folkes et al. | 198/837 |
| 4,047,712 | 9/1977 | Burkhardt et al. | 209/DIG. 1 |

FOREIGN PATENT DOCUMENTS

| | | | |
|---|---|---|---|
| 1114206 | 9/1961 | Fed. Rep. of Germany | 198/649 |
| 212515 | 3/1964 | Sweden | 209/DIG. 1 |
| 658953 | 10/1951 | United Kingdom | 214/44 A |
| 744233 | 2/1956 | United Kingdom | 198/728 |

*Primary Examiner*—Robert B. Reeves
*Assistant Examiner*—Richard K. Thomson
*Attorney, Agent, or Firm*—Spencer & Kaye

[57] ABSTRACT

A conveyor for transporting substantially flat articles, such as mail, along a trough by pusher fingers. The pusher fingers are individually mounted to carriers which are connected to pulling mechanism and guided by guide rails. The present conveyor design causes reduced operational noise and need for maintenance.

5 Claims, 4 Drawing Figures

CONVEYOR WITH PUSHER FINGERS

BACKGROUND OF THE INVENTION

The present invention relates to a conveyor which uses a combination of a trough to carry and direct substantially flat articles and carriers with pusher fingers to convey the articles along the trough. Conveyors of this type are illustrated by German Pat. No. 367,754. As is shown in German Pat. No. 367,754, carriers for the pusher fingers normally comprise a carriage having both upper and lower flanged wheels which enclose and ride on a vertical rail. The carriage is connected to and driven by a rotating endless cable by means of movable coupling elements. Such carriers require a great deal of maintenance and cause an undesirable amount of noise when in operation.

SUMMARY OF THE INVENTION

It is an object of the present invention to provide a conveyor of the above-mentioned type having carriers which are of simple construction and are connected to pulling means without moving parts. The present conveyor minimizes any maintenance required, has favorable wear behavior and operates with little noise.

The conveyor of the present invention utilizes individual carriers having members and to which pusher fingers are pivotally mounted. The carriers are connected at spaced intervals to a pulling means for moving the carriers in a conveying direction and are guided by guide means comprising guide rails having facing slide surfaces disposed substantially parallel to each other and which each coact with the members of the carriers, respectively. The guide means further may comprise an endless movable belt associated with each of the slide surfaces to coact with the members of the carriers. Other embodiments will become evident from the following description of the invention.

BRIEF DESCRIPTION OF THE DRAWINGS

The accompanying drawings, in which like numbers indicate same parts, illustrate examples of presently preferred embodiments of the invention and, together with the description, serve to explain the principles of the invention.

DESCRIPTION OF THE PREFERRED EMBODIMENTS

The subject invention is a conveyor which may be incorporated as part of a distribution system for transferring flat articles which are normally rectangular in form, such as letters and the like, from one place to another.

Figure 1:
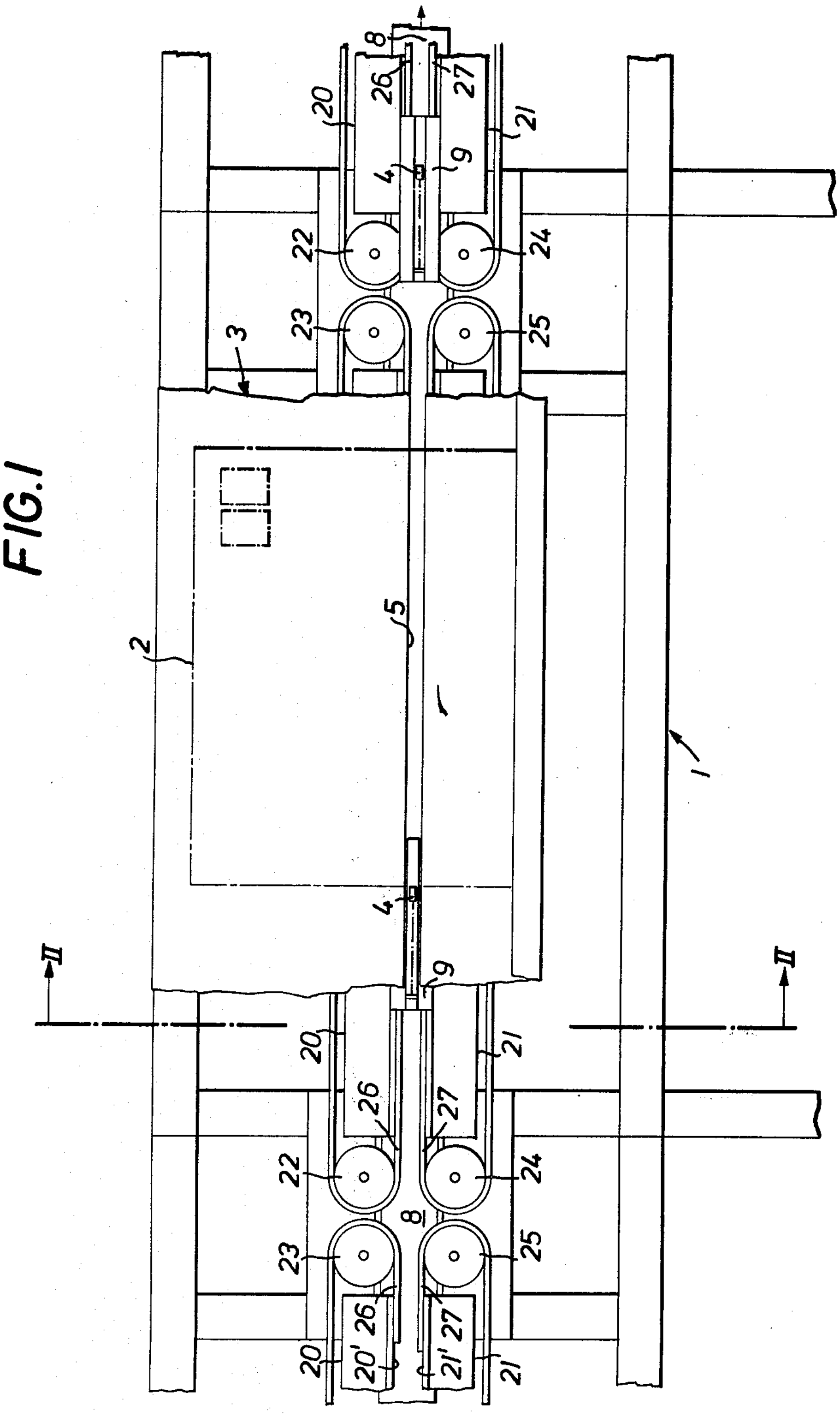
FIG. 1 is a side view and a partially schematic view of a conveyor according to the invention including slide fingers, the guide trough being shown only in the center portion.
Figure 2:
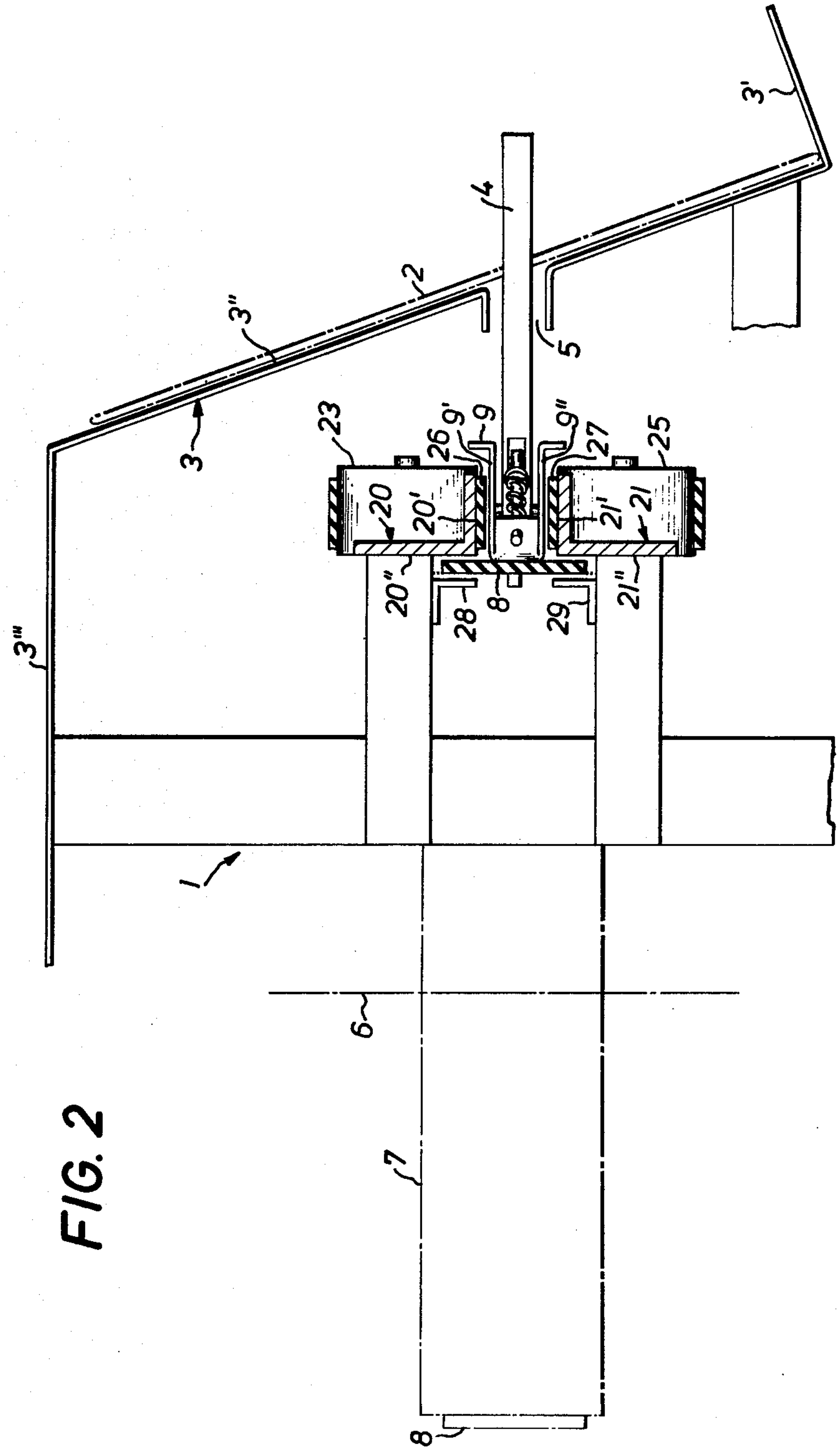
FIG. 2 is a cross-sectional view to a larger scale of the conveyor along the line II—II of FIG. 1.

Referring to FIG. 1, the subject conveyor is held by machine frame 1. The substantially flat articles to be conveyed, such as letters 2, are disposed in a conveying trough 3 which comprises contact surface 3′ upon which articles 2 rest, inclined surface 3″ and cover surface 3‴ as shown in FIG. 2. The inclined surface 3″ is provided with a slit 5 for the passage of pusher finger 4. The pusher finger 4 is connected to carrier 9 in association with its pulling and guiding means, as described herein below, which are normally located opposite to the side of inclined surface 3″ upon which is located article 2. The possible position of article 2, in the form of a letter, is indicated in FIGS. 1 and 2 by dot-dash lines.

Figure 4:
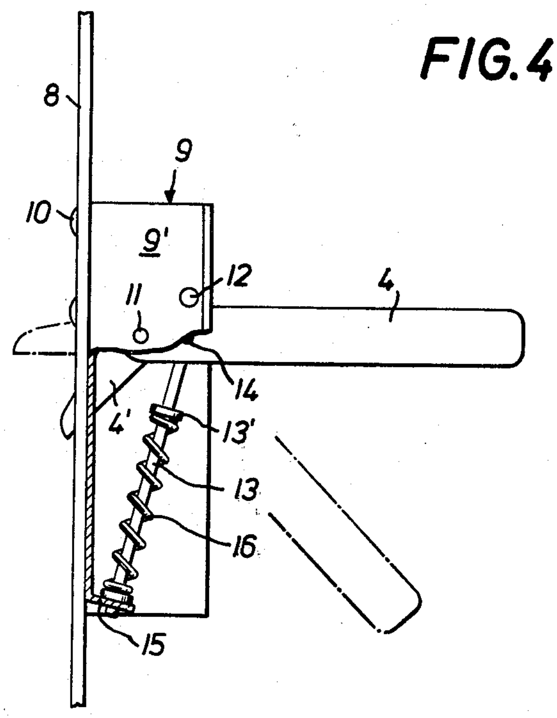
FIG. 4 is a partially cut away view of a carrier with pusher finger seen in the direction of the arrow IV in FIG. 3.

Referring to FIG. 2, an endless pulling means 8, preferably in the form of a belt, is guided over guide rollers rotating about axis 6 and of which the right-hand guide roller 7 is schematically shown. Pulling means 8 is driven in the conveying direction indicated by an arrow on the right portion of FIG. 1. Carriers 9 are individually connected at substantially uniform spaced intervals to pulling means 8 by means of connectors 10, such as screws or rivets, as shown in FIG. 4. Carriers 9 serve as mounts for pusher fingers 4 which sufficiently extend from the carrier to be in contact with the article 2 to cause article 2 to slide along trough 3.

The guide means for carriers 9 along the intended path of movement is constituted by guide rails 20 and 21 which have facing slide surfaces 20′ and 21′, respectively, which are substantially parallel with respect to each other and are preferably arranged perpendicular to the axis 6 of wheels 7 and belt 8.

Each carrier 9 has members 9′ and 9″ which coact as guide surfaces with sliding surfaces 20′ and 21′, respectively. In a preferred embodiment, members 9′ and 9″ of the individual carriers 9 are not in direct engagement with the slide surfaces 20′ and 21′, of guide rails 20 and 21. Rather, endless belts 26 and 27 are associated with respective ones of slide surfaces 20′ and 21′ to coact with members 9′ and 9″, respectively. Belts 26 and 27 are each guided by rollers located at each end of guide rails 20 and 21 for moving the belts in the conveying direction. The lower reach of belt 26 extends along slide surface 20′ to coact with member 9′ and is guided over rollers 22 and 23 located at each end of guide rail 20 for moving the belts in a conveying direction. Similarly, the upper reach of belt 27 extends along slide surface 21′ to coact with members 9″ and is guided by rollers 24 and 25 located at each end of guide rail 21 for moving in a conveying direction.

Although belts 26 and 27 can each be driven by one of their associated guide rollers, it is preferred to mount them to be freely movable. They are then moved along within a respective conveying section by the carrier 9 which enters that section and it is possible that other sections of belts 26 and 27 become sequentially active between the guide surfaces 9′ and 9″ of carrier 9 and the slide surfaces 20′ and 21′ of rail 20 or 21, respectively, as carrier 9 sequentially moves from one conveying section to another. The coefficient of friction between the belt and members 9′ and 9″ of carrier 9 is preferably greater than the coefficient of friction of the belt with sliding surfaces 20′ and 21′ of guide rails 20 or 21, respectively. Multiple pairs of rails 20 and 21 may be disposed along the conveying path. This is of advantage particularly for longer conveying paths.

Since carriers 9 are firmly connected to pulling means 8, the entirety of the above-described assembly not only provides for wear-resistance and quiet guidance of carriers 9, but also of pulling means 8 whose weight is thus carried over its entire length by rails 21 via carriers 9.

When the pulling means 8 is a belt or the like, the lateral guidance of the belt and of carriers 9 is attained with the aid, on the one hand, of guide surfaces 20″ and 21″ of rails 20 or 21, respectively, which surfaces 20″ and 21″ are perpendicular to slide surfaces 20′ and 21′, and, on the other hand, by two additional guides 28 and 29 which are fastened to machine frame 1.

Figure 3:
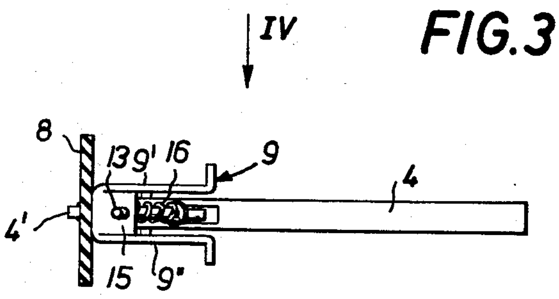
FIG. 3 is a detail view of the carrier with pusher fingers as shown in FIG. 2.

With reference to FIGS. 3 and 4, each carrier 9 has a pusher finger 4 mounted thereto and extending therefrom sufficiently to be capable of contacting and moving the article 2 along trough 3. To prevent malfunctioning of the conveyor, each pusher finger 4 is mounted to be pivotable in a direction opposite to the conveying direction by mounting means, such as a bolt or pin 11. The pusher finger 4 is held in operational position by an abutment 12 and by spring means which is shown in the Figures to comprise a rod 13 which has one end attached to pusher finger 4 by means of a bolt 14 and its other end guided by an abutment 15 formed by the housing with a compression spring 16 engaged between abutment 15 and a collar 13′ which is attached to rod 13. Abutment 15 is provided with an opening for passage of the free end of rod 13. In the illustrated embodiment, carrier 9 is advantageously designed as a housing which substantially encloses members 11 to 16. Elements 13 and 16 of carrier 9 are indicated by a dot-dash line in FIG. 1.

If the article 2 exhibits an increased resistance to movement, pusher finger 4 can, by the above-described design, be pivoted approximately into an escape position indicated by dot-dash lines in FIG. 4. When pusher finger 4 is in an escape position, a lever arm 4′ which may be attached to pusher finger 4 at its pivotal end, can pass through a slit in the carrier (not shown) and one in belt 8 (not shown) to actuate a signaling means such as a circuit.

It will be understood that the above description of the present invention is susceptible to various modifications, changes and adaptations, and the same are intended to be comprehended within the meaning and range of equivalents of the appended claims.

What is claimed is:

1. A conveyor for substantially flat articles comprising a trough defining a conveying path for the articles; carriers having first and second members; pusher fingers individually mounted in and extending from said carriers and capable of being in contact with the articles; a pulling means to which said carriers are firmly connected at spaced intervals for moving said carriers along the conveying path; a first guide rail having a slide surface disposed in guiding relation to one member of said carriers; a second guide rail having a slide surface disposed in guiding relation to a second member of said carriers, said slide surfaces being mutually parallel and facing each other; and two endless belts each associated with said slide surface of a respective one of said guide rails to coact with a respective one of said members, said belts being guided by rollers located at each end of said guide rails and moving in the same direction as said pulling means for effecting wear-resistant and quiet guidance of said carriers and of said pulling means.

2. The conveyor of claim 1, wherein said pulling means is an endless belt and said guide rails have surfaces substantially perpendicular to said slide surfaces to guide the lateral guidance of said endless belt of said pulling means.

3. The conveyor of claim 1, wherein the coefficient of friction between said endless belts and said first and second carrier members is greater than that between said endless belts and said slide surfaces.

4. The conveyor of claim 1, wherein each of said pusher fingers is mounted for pivotal movement in a direction opposite the conveying direction and further comprising spring means for holding the pusher fingers in operational position.

5. The conveyor of claim 4, wherein said spring means is housed within said carrier.

* * * * *